United States Patent
Goesmann (10) Patent No.: US 9,786,882 B2
(45) Date of Patent: Oct. 10, 2017

(54) ARRANGEMENT FOR SECURING AN ENERGY STORAGE MODULE ON A MODULE SUPPORT

(71) Applicant: Bayerische Motoren Werke Aktiengesellschaft, Munich (DE)

(72) Inventor: Hubertus Goesmann, Nattheim-Auernheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 401 days.

(21) Appl. No.: 14/197,540

(22) Filed: Mar. 5, 2014

(65) Prior Publication Data

US 2014/0186674 A1    Jul. 3, 2014

Related U.S. Application Data

(63) Continuation of application No. PCT/EP2012/003592, filed on Aug. 25, 2012.

(30) Foreign Application Priority Data

Sep. 13, 2011  (DE) .................. 10 2011 082 576

(51) Int. Cl.
*H01M 2/10* (2006.01)
*B60K 1/04* (2006.01)
*H01M 10/04* (2006.01)
*F16B 21/16* (2006.01)

(52) U.S. Cl.
CPC ............ *H01M 2/1083* (2013.01); *B60K 1/04* (2013.01); *H01M 10/0481* (2013.01); *B60K 2001/0455* (2013.01); *B60K 2001/0466* (2013.01); *F16B 21/165* (2013.01); *H01M 2220/20* (2013.01)

(58) Field of Classification Search
USPC ...... 429/163–187; 29/623.1–623.5; 180/68.5, 180/65.1, 65.21; 221/282; 206/703
See application file for complete search history.

(56) References Cited

U.S. PATENT DOCUMENTS

| | | | | |
|---|---|---|---|---|
| 4,987,834 A | * | 1/1991 | Peck, Jr. ............. | B23Q 7/1436 104/128 |
| 5,121,806 A | * | 6/1992 | Johnson ............... | B60K 1/04 180/65.51 |
| 5,535,703 A | * | 7/1996 | Kerzner .............. | A01K 15/025 119/707 |

(Continued)

FOREIGN PATENT DOCUMENTS

| CN | 101212032 A | 7/2008 |
|---|---|---|
| DE | 10 2007 007 956 A1 | 8/2008 |

(Continued)

OTHER PUBLICATIONS

International Search Report dated May 29, 2013 with Statement of Relevancy (Six (6) pages.

(Continued)

*Primary Examiner* — Kaity Chandler
(74) *Attorney, Agent, or Firm* — Crowell and Moring LLP (57) ABSTRACT

The invention relates to an arrangement comprising an energy storage module, a module carrier, particularly a vehicle body, and a ball lock bolt for fastening the energy storage module on the module carrier.

20 Claims, 4 Drawing Sheets

(56) References Cited

U.S. PATENT DOCUMENTS

| | | | | |
|---|---|---|---|---|
| 5,845,898 A * | 12/1998 | Halder | ............... | F16B 21/165 |
| | | | | 269/48.1 |
| 7,021,615 B2 | 4/2006 | Kuroda | | |
| 8,071,234 B2 | 12/2011 | Okada et al. | | |
| 8,572,849 B1 * | 11/2013 | Clark | ............... | F16M 11/14 |
| | | | | 29/281.5 |
| 9,224,999 B2 * | 12/2015 | Dunn | ............... | H01M 2/024 |
| 2003/0017387 A1 * | 1/2003 | Marukawa | ............... | H01M 2/1077 |
| | | | | 429/156 |
| 2004/0251858 A1 * | 12/2004 | Asao | ............... | B60K 1/04 |
| | | | | 318/139 |
| 2006/0083980 A1 * | 4/2006 | Choo | ............... | H01M 2/202 |
| | | | | 429/120 |
| 2006/0244318 A1 * | 11/2006 | Glauning | ............... | H01M 2/1022 |
| | | | | 310/50 |
| 2008/0160395 A1 | 7/2008 | Okada et al. | | |
| 2010/0112424 A1 * | 5/2010 | Hayashi | ............... | H01M 2/1077 |
| | | | | 429/99 |
| 2010/0167115 A1 * | 7/2010 | Okada | ............... | H01M 2/1077 |
| | | | | 429/99 |
| 2010/0248008 A1 * | 9/2010 | Sugawara | ............... | H01M 2/1077 |
| | | | | 429/159 |
| 2011/0020677 A1 * | 1/2011 | Shin | ............... | H01M 2/0277 |
| | | | | 429/71 |
| 2011/0070475 A1 * | 3/2011 | Thomas | ............... | H01M 2/1083 |
| | | | | 429/120 |
| 2011/0244282 A1 * | 10/2011 | Seto | ............... | H01M 2/1077 |
| | | | | 429/82 |
| 2012/0038322 A1 * | 2/2012 | Moorhead | ............... | B60L 11/1861 |
| | | | | 320/136 |
| 2012/0064386 A1 * | 3/2012 | Oguri | ............... | H01M 2/1016 |
| | | | | 429/156 |
| 2012/0121959 A1 * | 5/2012 | Yamada | ............... | B60K 1/04 |
| | | | | 429/100 |
| 2012/0156537 A1 * | 6/2012 | Meintschel | ............... | B60L 11/1874 |
| | | | | 429/99 |
| 2012/0315508 A1 * | 12/2012 | Kurita | ............... | H01M 2/1077 |
| | | | | 429/7 |
| 2013/0052516 A1 * | 2/2013 | Kim | ............... | H01M 2/1016 |
| | | | | 429/159 |
| 2013/0164577 A1 * | 6/2013 | Insana | ............... | H01M 2/1077 |
| | | | | 429/72 |
| 2013/0224541 A1 * | 8/2013 | Nam | ............... | H01M 2/1016 |
| | | | | 429/90 |
| 2013/0260611 A1 * | 10/2013 | Ahn | ............... | H01M 2/1077 |
| | | | | 439/627 |
| 2015/0037649 A1 * | 2/2015 | Wyatt | ............... | H01M 10/625 |
| | | | | 429/120 |

FOREIGN PATENT DOCUMENTS

| | | |
|---|---|---|
| EP | 0 508 248 A1 | 10/1992 |
| EP | 1 939 956 B1 | 12/2010 |
| EP | 2 374 646 A2 | 10/2011 |
| FR | 2 721 559 A1 | 12/1995 |
| JP | H09 274906 | 10/1997 |
| TW | 592881 B | 6/2004 |

OTHER PUBLICATIONS

German Search Report dated Jul. 25, 2012 with Statement of Relevancy (Five (5) pages).
Chinese Office Action issued in counterpart Chinese Application No. 201280035414.7 dated Jul. 28, 2015 with partial English translation (Twelve (12) pages).
Chinese Office Action issued in Chinese counterpart application No. 201280035414.7 dated Oct. 19, 2016, with English translation (Fourteen (14) pages).
Chinese Office Action issued in Chinese counterpart application No. 201280035414.7 dated Apr. 12, 2016, with English translation (Fourteen (14) pages).

* cited by examiner

PRIOR ART

ARRANGEMENT FOR SECURING AN ENERGY STORAGE MODULE ON A MODULE SUPPORT

CROSS REFERENCE TO RELATED APPLICATIONS

This application is a continuation of PCT International Application No. PCT/EP2012/003592, filed Aug. 25, 2012 which claims priority under 35 U.S.C. §119 from German Patent Application No. 10 2011 082 576.2, filed Sep. 13, 2011, the entire disclosures of which are herein expressly incorporated by reference.

BACKGROUND AND SUMMARY OF THE INVENTION

The present invention relates to an arrangement for fastening an energy storage module on a module carrier, particularly a vehicle body.

In a device, usually called a battery, for supplying power to a motor vehicle, a plurality of energy storage modules are normally used for driving the vehicle, for example, electric vehicles or hybrid vehicles. A respective energy storage module typically consists of several stacked prismatic storage cells. The individual storage cells contain electrochemical cells of the battery. The stack on the individual storage cells is usually braced by means of a mechanical end plate (also called "pressure plate") and a tension member for forming the energy storage module. Additionally to mechanically fixing the modules with respect to one another, the end plates and tension members are particularly used for counteracting a deformation as a result of gas pressure changes, which occur during the operation in the electrochemical cells arranged in the interior of the modules.

Figure 2:
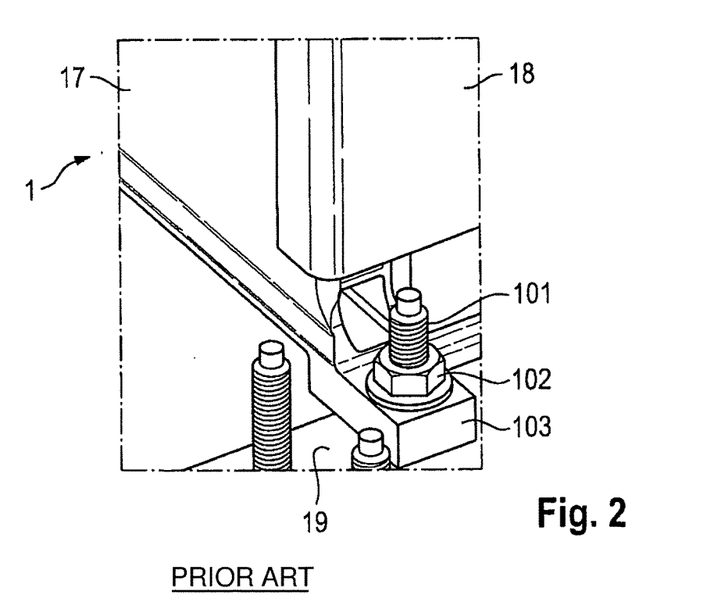
FIG. 2 is a view of a conventional fastening of an energy storage module on a module carrier according to the state of the art.

The energy storage modules are mounted in devices for the power supply, particularly in motor vehicles. This usually takes place by means of a fastening device, for example, a bolt or a screw. For the connection between the bolt and the energy storage module, projections had previously been provided at the energy storage module. The fastening device is fitted through these projections and can thereby be connected by screwing, for example, in the motor vehicle. These projections protrude beyond the energy storage module and thereby unfavorably increase the installation space for the energy storage module. Furthermore, this fastening method by means of bolts and nuts results in high mounting expenditures. FIG. 2 illustrates a screwed connection of an energy storage module 1 on a module carrier 19 which did not take place according to the invention. As illustrated here, in the case of this conventional method, an extension 103 protrudes beyond the end plate 17 of the energy storage module 1. A bolt 101 is fitted as the fastening device in this extension 103. This bolt 101 is fixed by means of the screwed connection 102.

It is an object of the present invention to indicate an arrangement for fastening an energy storage module on a module carrier, which arrangement can be easily produced and mounted and permits a simple and secure fastening while the installation space is as small as possible.

This object is achieved by the respective combinations of characteristics of the independent claims. The dependent claims each show advantageous embodiments of the invention.

The object is therefore achieved by an arrangement, comprising an energy storage module, a module carrier, particularly a vehicle body, and a ball lock bolt designed for fastening the energy storage module on the module carrier.

In a preferred embodiment, it is provided that a first end of the ball lock bolt is fixedly connected with the module carrier. The energy storage module is fitted onto the other end of the ball lock bolt and is latched by means of the balls in the ball lock bolt. As an alternative, it is also conceivable that the first end of the ball lock bolt is fixedly connected with the energy storage module. In this case, during the mounting, the energy storage module is then fitted, by means of the ball lock bolt fastened thereto, into the module carrier, and the module carrier is latched by means of the balls at the ball lock bolt.

The ball lock bolt preferably comprises several balls at the circumference of the ball lock bolt and an unlatching pin in the interior of the ball lock bolt. In this case, the unlatching pin is preferably spring-loaded such that it presses the balls toward the outside. As a result, the balls protrude slightly beyond the circumference of the ball lock bolt, and the fitted-on component, specifically the energy storage module or the module carrier, can thereby be clamped in between the balls and the fixed end of the ball lock bolt. In a preferred embodiment, it is provided that a clamping sleeve for the force transmission between the balls and the fitted-on component is arranged on the ball lock bolt between the first (fixed) end and the balls. For this purpose, the fitted-on component preferably comprises a passage hole having a shoulder. One face side of the clamping sleeve thereby rests against the balls, and the other face side of the clamping sleeve rests on the shoulder.

In a particularly preferred embodiment, it is provided that, on the face side facing the balls, the clamping sleeve has a funnel-shaped clamping cone as the support surface for the balls. As a result, a clamping that is free from play is ensured between the clamping sleeve and the balls.

It is further preferably provided that the clamping sleeve comprises at least one disk spring and/or at least one elastic element for compensating a play in the axial direction. Here, the axial direction is the axial dimension of the ball lock bolt or of the passage holes in the energy storage module or in the module carrier.

The invention further comprises an arrangement having an energy storage module, a module carrier, particularly a vehicle body, and a clamping device designed for fastening the energy storage module on the module carrier, the clamping device comprising a clamping bolt and a clamping sleeve expanded by the clamping bolt.

In a preferred embodiment, it is provided that a first end of the clamping bolt is screwed into the module carrier, and the energy storage module can be fitted on the other end of the clamping bolt and can be clamped by means of expanding the clamping sleeve. In an alternative variant, the first end of the clamping bolt is screwed into energy storage module, and the module carrier is fitted onto the other end of the clamping bolt and is clamped by means of expanding the clamping sleeve. For screwing in the clamping bolt, particularly a screw-in sleeve is provided in the module carrier or in the energy storage module.

In a preferred embodiment, it is provided that the clamping sleeve is arranged on the clamping bolt between the first (fixed) end and a clamping bolt head for the transmission of force between the clamping bolt head and the fitted-on component, specifically the energy storage module or the module carrier. In this case, the clamping sleeve is disposed in a cuff-type manner around the clamping bolt. The fixed end of the clamping bolt is screwed into the module carrier or the energy storage module. The respective other component has no direct contact with the clamping bolt but is in contact only with the clamping sleeve. By means of the screwing-in of the clamping bolt, the clamping sleeve is expanded and thereby permits the clamping of the component to the fastened on the clamping bolt.

In the case of this fastening by means of the clamping bolt and the clamping sleeve, the passage hole in the fitted-on component is preferably constructed with a uniform diameter. Here, no shoulders are necessary in the passage hole. The passage hole has the uniform diameter of the clamping sleeve or is only insignificantly larger than the clamping sleeve.

In a further preferred development, it is provided that the face side of the clamping sleeve facing the clamping bolt has a funnel-shaped clamping cone, an outer cone at the clamping bolt head resting flatly on the clamping cone and thereby expanding the clamping sleeve when the bolt is screwed in. As a result of this flat resting of the funnel-shaped clamping cone on the clamping bolt head, a secure expansion of the clamping sleeve and a reliable force transmission from the clamping bolt head to the clamping sleeve are ensured.

It is further preferably provided that the clamping sleeve has a slot in the axial direction. The clamping sleeve can thereby easily be expanded.

Further, according to the invention, an arrangement is provided which has an energy storage module, a module carrier, particularly a vehicle body, and a detent device designed for fastening the energy storage module on the module carrier. The detent device according to the invention comprises a mounting device with at least one detent lug and a detent tongue engaged behind the detent lug. The detent lug is preferably constructed as a detent web and therefore represents sufficient surface area, behind which the detent tongue can engage.

It is further preferably provided that a first end of the mounting device is fixedly connected with the module carrier, and the energy storage module can be fitted onto the other end of the mounting device and can be latched and unlatched by means of the detent lug and the detent tongue. As an alternative, it is provided that the first end of the mounting device is fixedly connected with the energy storage module, and the module carrier can be fitted onto the other end of the mounting device and can be latched and unlatched by means of the detent lug and the detent tongue. In the first variant, the detent tongue is fastened to the energy storage module. In the second variant, the mounting device is fastened to the energy storage module, whereas the detent tongue is fastened to the module carrier.

In an advantageous embodiment, it is provided that the detent tongue has a resilient construction for an independent engagement behind the detent lug and/or is spring-loaded. During the mounting, the components therefore only have to be fitted together, and the engagement takes place automatically.

It is further preferably provided that the mounting device comprises several detent lugs that are arranged behind one another, advantageously several detent lugs that are arranged parallel to one another. As a result, manufacturing tolerances can be compensated because the detent tongue engages in the respectively fitting detent lug.

In particular, the detent tongue is rotatably by way of a hinge bolt disposed on the energy storage module or on the module carrier. As a result, the detent tongue can engage at the mounting device on one side of the hinge bolt. A release lever is preferably situated on the other side of the hinge bolt. By means of a pulling or pressing of this release lever, the detent tongue will disengage again from the mounting device, and the energy storage module can be detached.

All three arrangements according to the invention have in common that, instead of providing the conventional screwed connection, they provide a clamping connection between the energy storage module and the module carrier.

In the following, advantageous designs will be described, which are preferred for a use in all three arrangements according to the invention, thus for the fastening by means of a ball lock bolt, a clamping device and a detent device: The energy storage module is, in particular, a device for the power supply, consisting of several storage cell which are braced by way of tension members between two end plates. Particularly preferably, the fastening between the energy storage module and the module carrier takes place by way of these end plates. For this purpose, the end plates preferably have passage holes for the fastening by means of ball lock bolts or a clamping device. The ball lock bolts or the clamping bolts and the clamping bolts sleeves will then project into these passage holes in the end plates. In the case of the fastening by means of the detent device, the end plates particularly have a cavity. The mounting device will then project into this cavity by means of the detent lugs, and the detent tongue is also preferably fastened in this cavity.

Particularly preferably, an energy storage module is connected to the module carrier by means of two, particularly four, of the above-mentioned arrangements, more precisely, by means of ball lock bolts, clamping devices or detent devices. In this case, the above-mentioned different fastening arrangements may also be combined.

Furthermore, a stacking of energy storage modules above one another is preferably provided. Two basic arrangements exist for this purpose: Preferably, the bottom energy storage module is fastened to the module carrier by means of one of the three arrangements according to the invention. With respect to the second energy storage module (placed on the first energy storage module) the energy storage module situated on the bottom is the "module carrier". This means that the energy storage module situated on top is fastened to the energy storage module situated on the bottom by means of one of the three arrangements according to the invention.

In an alternative variant for the fastening of stacked energy storage modules, it is provided that the ball lock bolt, the clamping bolt or the mounting devices are designed to be so long or high that a first energy storage module can be fitted only onto the ball lock bolt, the clamping bolt or the mounting device. An additional energy storage module will then also be fitted onto the same ball lock bolt, the clamping bolt or the mounting device, in which case only this additional energy storage module will be latched, clamped or engaged by means of the ball lock bolt, the clamping bolt or the mounting device.

The end plates of the energy storage modules may preferably consist of diecast metal, particularly of diecast aluminum, of extruded profiles or of metal plates.

In the following, the invention will be explained in detail by means of three embodiments illustrated in the figures.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description, the invention will be explained in detail by means of FIGS. 1 and 3 to 7. FIG. 2 illustrates a conventional screwed connection of an energy storage module 1 on a module carrier 19, which was not carried out according to the invention.

Figure 1:
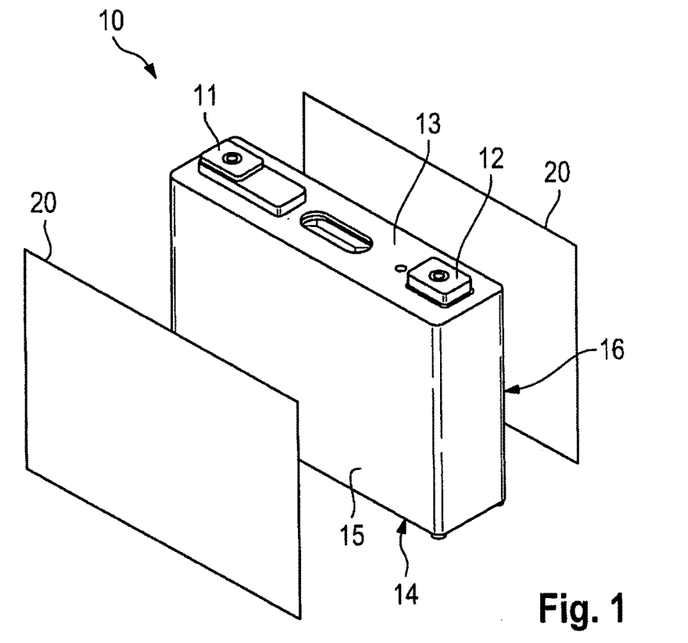
FIG. 1 is a view of storage cells of the energy storage module according to all embodiments.

FIG. 1 is a perspective view of an individual prismatic storage cell 10 of an energy storage module used according to the invention. The storage cell 10 typically consists of one or more individual electrochemical cells which, in the representation selected here, are situated hidden in the interior of the storage cell 10. The storage cell 10 has a connection terminal 11 of a first polarity and a connection terminal 12 of a second polarity on the front 13. No connection elements are provided on the back 14 of the storage cell 10 not shown in FIG. 1. One of the connection terminals 11, 12, typically the positive pole of the storage cell 10, can be electrically connected with a housing of the storage cell 10. Since, in the energy storage module 1 used according to the invention, several storage cells 10, stacked in at least one row, are arranged behind one another, at least opposite main surfaces 15, 16 are equipped with an electrically insulating material. In the example illustrated in FIG. 1, an adhesive foil 20 is applied to the main surfaces 15, 16. For producing the energy storage module, several of the storage cells 10 are stacked behind one another. In this case, the individual storage cells 10 come in contact with one another on the main surfaces 15, 16. One end plate 17 (also called pressure plate) respectively will then be situated on the main surface 15 of the first storage cell 10 and the main surface 16 of the last storage cell 10 in the stacked row. The two end plates 17 are braced with respect to one another by way of tension members 18.

The connection possibilities of the energy storage module with the module carrier illustrated in the following preferably apply to the end plates 17 of the energy storage modules 1.

Figure 3:
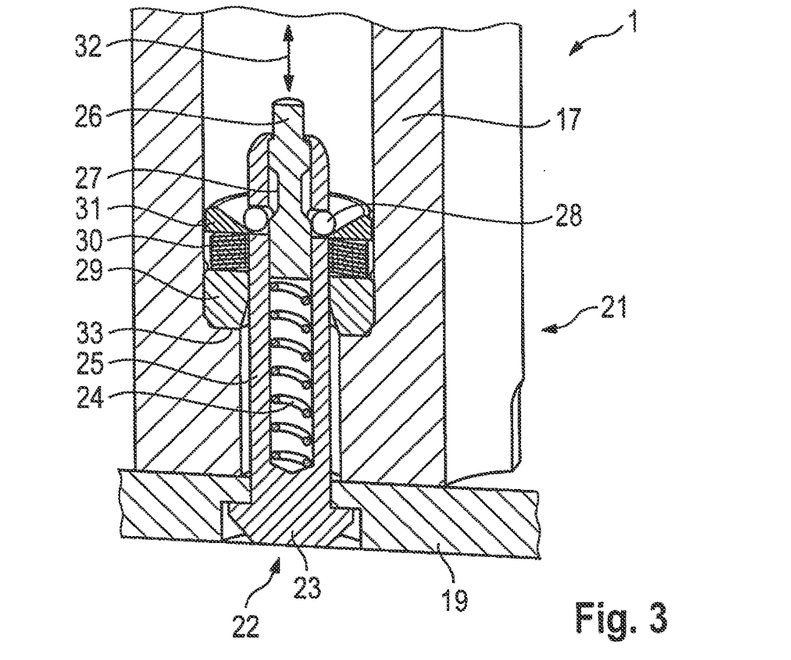
FIG. 3 is a view of a first embodiment of the arrangement according to the invention.

FIG. 3 illustrates a first embodiment of an arrangement 21 for fastening the energy storage module 1 on the module carrier 19. For this purpose, a first end 23 of a ball lock bolt 22 is fixedly connected with the module carrier 19. The end plate 17 of the energy storage module 1 is fitted onto this ball lock bolt 22 and is latched with it.

The ball lock bolt 22 comprises a lock bolt housing 25. At the circumference of this lock bolt housing 25, recesses are provided in which balls 28 are disposed. A cavity is situated in the interior of the lock bolt housing 25. An unlatching pin 26 is arranged in this cavity. This unlatching pin 26 has a tapering 27. In the latched condition a pressure spring 24, which is arranged in the cavity of the lock bolt housing 25, loads the unlatching pin such that the tapering 27 will not be situated at the level of the balls 28. As a result, the unlatching pin 26 presses the balls 28 so far toward the outside that the balls 28 protrude slightly beyond the circumference of the lock bolt housing 25. By the pressure of the unlatching pin 26 against the force of the pressure spring 24, the tapering 27 is shifted to the level of the balls 28. As a result, the balls 28 can yield slightly toward the interior, whereby the balls 38 will no longer protrude beyond the circumference of the lock bolt housing 25.

A clamping sleeve 29 is fitted on the ball lock bolt 22 below the balls 28. The face side of the clamping sleeve 29 facing the balls 28 has a funnel-shaped clamping cone 31 as a support surface for the balls 28. The opposite face side of the clamping sleeve 29 sits on a shoulder 33 in a passage bore in the end plate 17. The clamping sleeve 30 further comprises at least one disk spring 30. This disk spring 30 presses the two face sides of the clamping sleeve 29 slightly apart in the axial direction 32. As a result, a clamping between the balls 28 and the shoulder 33 becomes possible that is free of play.

The fastening variant of the energy storage module 1 illustrated here is mounted very rapidly because the energy storage module 1 only has to be fitted onto the ball lock bolt 22 (or several ball lock bolts 22). A demounting takes place by pressing the unlatching pin 26.

Figure 4:
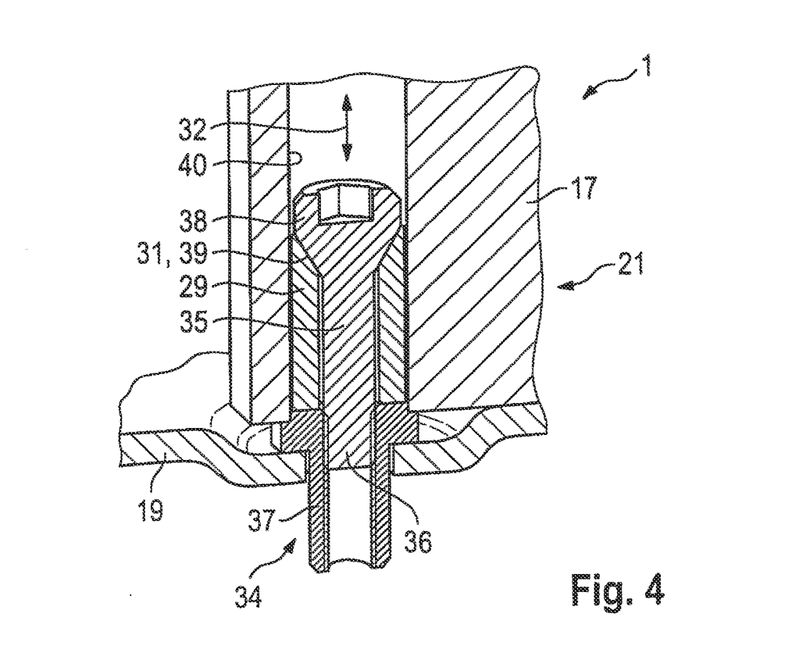
FIG. 4 is a view of a second embodiment of the arrangement according to the invention.

FIG. 4 illustrates a second embodiment of the arrangement 21 according to the invention. Here, the fastening between the energy storage module 1 or the end plate 17 of the energy storage module 1 and the module carrier 19 takes place by means of a clamping device 34. The clamping device 34 comprises a clamping bolt 35, a clamping sleeve 29 changed with respect to the first embodiment as well as a screw-in sleeve 37.

The screw-in sleeve 37 is situated in the module carrier 19 and provides an internal thread for the clamping bolt 35. At its first (fixed) end 36, the clamping bolt 35 has an external thread. With this end 36, the clamping bolt 35 is screwed into the screw-in sleeve 37. At the opposite end, the clamping bolt 35 has a clamping bolt head 38. The clamping sleeve 29 is situated between the clamping bolt head 38 and the fixed end 36. Here, the clamping sleeve 29 is designed as a slotted sleeve. The contact surface between the clamping bolt head 38 and the clamping sleeve 29 is designed as an external cone 39 at the clamping bolt head 38 and as a funnel-shaped clamping cone 31 at the clamping sleeve 29. As a result, on the one hand, a flat contact of the clamping bolt head 38 on the clamping sleeve 39 is ensured and, on the other hand, by means of the screwing-in of the clamping bolt 35, the clamping sleeve 39 can be expanded.

The pressure plate 17 has a passage hole 40. This passage hole 40 has a continuous uniform diameter. The diameter of the passage hole 40 corresponds approximately to the outside diameter of the clamping sleeve 29. As a result, even before the energy storage module 1 is set onto module carrier 19, the clamping bolt 35, including the clamping sleeve 29, can be screwed into the module carrier 19. During the mounting, the energy storage module 1 will then be placed, and the clamping bolt 35 will be screwed farther into the module carrier 19 or into the screw-in sleeve 37. The clamping sleeve 29 will thereby expand and clamp the energy storage module 1 with respect to the clamping bolt head 38.

Figure 5:
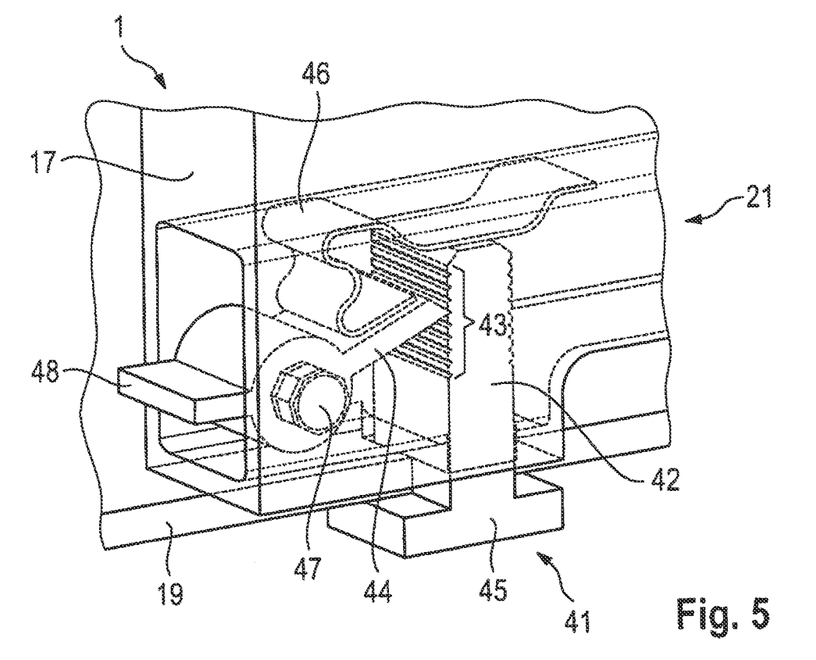
FIG. 5 is a view of a third embodiment of the arrangement according to the invention.

FIG. 5 illustrates a third embodiment of the arrangement 21 according to the invention. Here, the fastening between the energy storage module 1 or the end plate 17 and the module carrier 19 takes place by means of a detent device 41.

The detent device 41 comprises a mounting device 42 and a detent tongue 44. The mounting device 42 is fastened with a first (fixed) end 45 to the module carrier 19. The mounting device 42 projects into the end plate 17 and comprises several detent lugs 43. Here, the detent lugs 43 are designed as detent webs which are arranged parallel above one another.

In the interior of the end plate 17, the detent tongue is connected with the energy storage module 1 by way of a hinge bolt 47. On one side of the hinge bolt 47, the detent tongue 44 engages behind a corresponding detent lug 43. A release lever 48 of the detent tongue 44 is situated on the other side of the hinge bolt 47. The connection between the detent tongue 44 and the mounting device 42 can be released again by pressing this release lever 48. Furthermore, the detent tongue 44 is spring-loaded here in the direction of the module carrier 19 by means of the contact pressure spring 46. An automatic engaging of the detent tongue 44 thereby takes place when the energy storage module 1 is fitted onto the mounting device 42.

Figure 6:
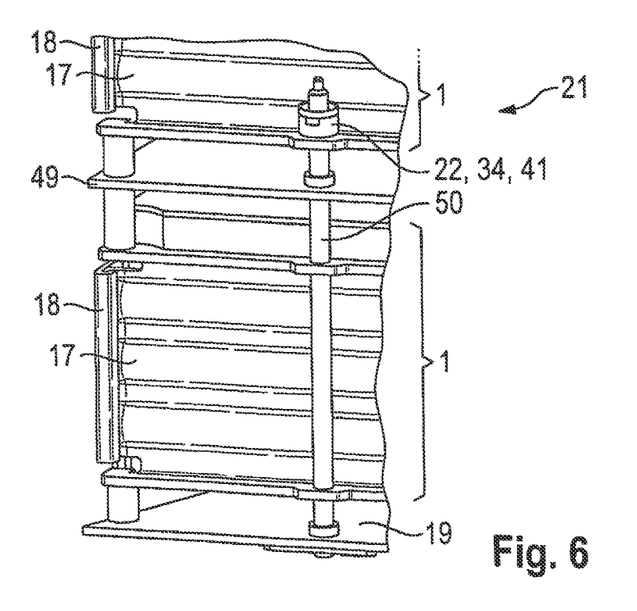
FIG. 6 is a view of a fastening according to the invention of stacked energy storage modules according to all embodiments.
Figure 7:
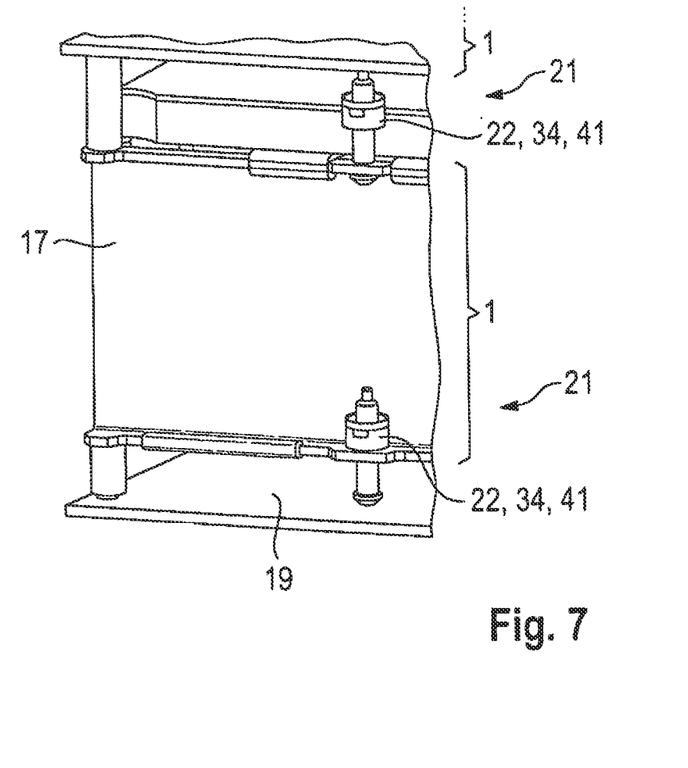
FIG. 7 is a view of a further fastening according to the invention of stacked energy storage modules according to all embodiments.

FIGS. 6 and 7 illustrate two possibilities for fastening stacked energy storage modules 1 on a module carrier 19. The arrangements 21 according to the first, the second or the third embodiment respectively can be used for this purpose.

FIG. 6 illustrates two energy storage modules 1 stacked above one another. For the fastening, the ball lock bolt 22, the clamping bolt 35 or the mounting device 42 is fixedly connected here to the module carrier 19 and extends in the upward direction. The bottom energy storage module 1 is first fitted onto the ball lock bolt 22, the clamping bolt 35 or the mounting device 42. Then a spacer sleeve 50 and an intermediate plate 49 are fitted on. After the intermediate plate 49, the second energy storage module 1 is fitted on. Only this second energy storage module 1 will then be latched, clamped or engaged by means of the ball bolt lock, the clamping bolt 35 or the mounting device 42.

FIG. 7 then illustrates a second variant for fastening several stacked energy storage modules 1. Here, the bottom energy storage module 1, as in the described arrangements 21, is fastened according to one of the three embodiments directly to the module carrier 19. For the second energy storage module 1 situated above, the energy storage module 1 situated below represents the "module carrier". This means that the energy storage module 1 situated on top is fastened by means of one of the arrangements 21 according to one of the three embodiments directly to the energy storage module 1 situated at the bottom.

LIST OF REFERENCE NUMBER

1 Energy storage module
10 Storage cells
11, 12 Connection terminal
13 Front
14 Back
15, 16 Main surfaces
17 End plates
18 Tension member
19 Module carrier
20 Adhesive foil
21 Arrangement
22 Ball lock bolt
23 First (fixed) end of ball lock bolt
24 Pressure spring
25 Lock bolt housing
26 Unlatching pin
27 Tapering
28 Balls
29 Clamping sleeve
30 Disk springs
31 Clamping cone
32 Axial direction
33 Shoulder
34 Clamping device
35 Clamping bolt
36 First clamp-fixed clamp end of the clamping bolt
37 Screw-in sleeve
38 Clamping bolt head
39 Clamping bolt head external cone
40 Passage hole
41 Detent device
42 Mounting device
43 Detent lug
44 Detent tongue
45 First clamp-fixed clamp end of the mounting device
46 Contact pressure spring
47 Hinge bolt
48 Release lever
49 Intermediate plate
50 Spacer sleeve
101 Screw/bolt
102 Nut
103 Extension The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for securing an energy storage module on a module carrier, the arrangement comprising:
   an energy storage module, including one or more energy storage cells braced together in series between opposing end plates,
   a module carrier, and
   a ball lock bolt inserted into a chamber formed within at least one end plate so as to fasten the energy storage module on the module carrier.

2. The arrangement according to claim 1, wherein a first end of a ball lock bolt is fixedly connected with one of (i) the module carrier, wherein the energy storage module is fitted on a second end of the ball lock bolt and can be latched and unlatched by means of balls at a circumference of the ball lock bolt, and (ii) the energy storage module, wherein the module carrier is fitted on the second end of the ball lock bolt and can be latched and unlatched by means of balls on the circumference of the ball lock bolt.

3. The arrangement according to claim 2, wherein a clamping sleeve is arranged on the ball lock bolt between the first end and the balls, for the transmission of force between the balls and the one of the energy storage module and the module carrier fixedly connected to the first end.

4. The arrangement according to claim 3, wherein on a side facing the balls, the clamping sleeve has a funnel-shaped clamping cone configured as a supporting surface for the balls.

5. The arrangement according to claim 3, wherein the clamping sleeve comprises at least one disk spring and at least one elastic element compensating play in an axial direction.

6. The arrangement according to claim 4, the clamping sleeve comprises at least one disk spring and at least one elastic element compensating play in an axial direction.

7. An arrangement for fastening an energy storage module on a module carrier, the arrangement comprising:
- an energy storage module, including one or more energy storage cells braced together in series between opposing end plates,
- a module carrier, and
- a clamping device inserted into a chamber formed within at least one end plate so as to fasten the energy storage module on the module carrier, the clamping device comprising: a clamping bolt and a clamping sleeve expanded by the clamping bolt.

8. The arrangement according to claim 7, wherein a first end of the clamping bolt is screwed into one of (i) the module carrier, wherein the energy storage module can be fitted on a second end of the clamping bolt and can be clamped by means of an expanding of the clamping sleeve, and (ii) the energy storage module, wherein the module carrier can be fitted on the second end of the clamping bolt and can be clamped by means of an expanding of the clamping sleeve.

9. The arrangement according to claim 8, wherein the clamping sleeve is arranged on the clamping bolt between the first end and a clamping bolt head and is configured to transmit force between the clamping bolt head and the one of the energy storage module and the module carrier fixedly connected to the first end.

10. The arrangement according to claim 8, wherein the clamping sleeve has a slot in an axial direction.

11. The arrangement according to claim 9, wherein a side of the clamping sleeve facing the clamping bolt has a funnel-shaped clamping cone, and wherein an outer cone of the clamping bolt head rests flatly on the clamping cone so as to expand the clamping sleeve when the clamping bolt is screwed in.

12. The arrangement according to claim 9, wherein the clamping sleeve has a slot in an axial direction.

13. The arrangement according to claim 11, wherein the clamping sleeve has a slot in an axial direction.

14. The arrangement according to claim 7, wherein the clamping sleeve has a slot in an axial direction.

15. An arrangement for fastening an energy storage module on a module carrier, the arrangement comprising:
- an energy storage module, including one or more energy storage cells braced together in series between opposing end plates,
- a module carrier, and
- a detent device inserted into a chamber formed within at least one end plate so as to fasten the energy storage module on the module carrier, wherein the detent device comprises a mounting device having at least one detent lug and a detent tongue engaging behind the detent lug.

16. The arrangement according to claim 15, wherein a first end of the mounting device is fixedly connected with one of (i) the module carrier, wherein the energy storage module can be fitted onto a second end of the mounting device and can be latched and unlatched by means of the detent lug and the detent tongue, and (ii) the energy storage module, wherein the module carrier can be fitted onto the second end of the mounting device and can be latched and unlatched by means of the detent lug and the detent tongue.

17. The arrangement according to claim 15, wherein the detent tongue is designed to be one of elastic and spring-loaded for an independent engaging behind the detent lug.

18. The arrangement according to claim 16, wherein the detent tongue is designed to be one of elastic and spring-loaded for an independent engaging behind the detent lug.

19. The arrangement according to claim 15, wherein the mounting device comprises a plurality of parallel detent lugs.

20. The arrangement according to claim 15, wherein the energy storage module comprises a device for the power supply of a motor vehicle.

* * * * *